United States Patent

[11] 3,566,735

| [72] | Inventor | Max E. Greene |
| | | Spartanburg, S.C. |
| [21] | Appl. No. | 798,654 |
| [22] | Filed | Feb. 12, 1969 |
| [45] | Patented | Mar. 2, 1971 |
| [73] | Assignee | Phillips Petroleum Company |

[54] FIBRILLATION
5 Claims, 4 Drawing Figs.

[52] U.S. Cl. ................................................. 83/344,
83/347, 83/660, 83/678, 225/97
[51] Int. Cl. ........................................................ B26f 3/00,
B26f 1/20
[50] Field of Search .......................................... 225/93, 97,
3; 28/1 (F); 83/344, 347, 660, 678

[56] References Cited
UNITED STATES PATENTS

| 1,260,694 | 3/1918 | Marresford | 83/344 |
| 2,068,456 | 1/1937 | Hooper | 83/2 |
| 2,762,433 | 9/1956 | Russell | 83/344X |
| 3,074,303 | 1/1963 | Waters | 83/660X |
| 3,147,658 | 9/1964 | Boyd | 83/347 |
| 3,407,691 | 10/1968 | Schlesinger | 83/344 |
| 3,460,416 | 8/1969 | Gilbert | 225/3X |

Primary Examiner—James M. Meister
Attorney—Young & Quigg

ABSTRACT: An apparatus for fibrillating a film of thermoplastic material. The apparatus includes a pair of counter-rotating rollers having confronting peripheries which define a fibrillating zone. Mechanical means are provided for applying a force on one of the rollers to maintain a predetermined pressure in the fibrillating zone.

Patented March 2, 1971
3,566,735
2 Sheets-Sheet 1
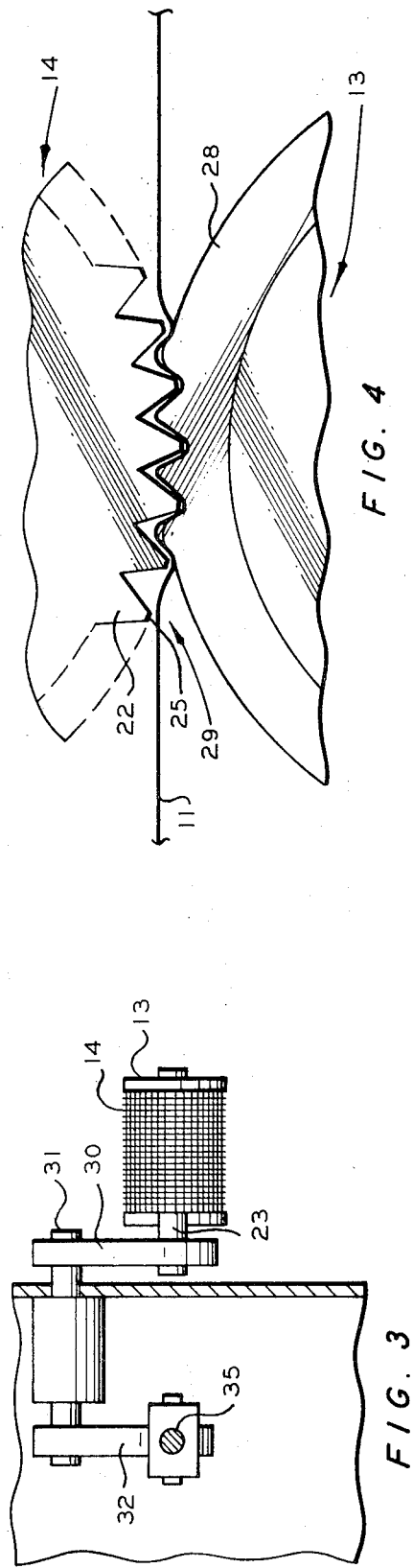
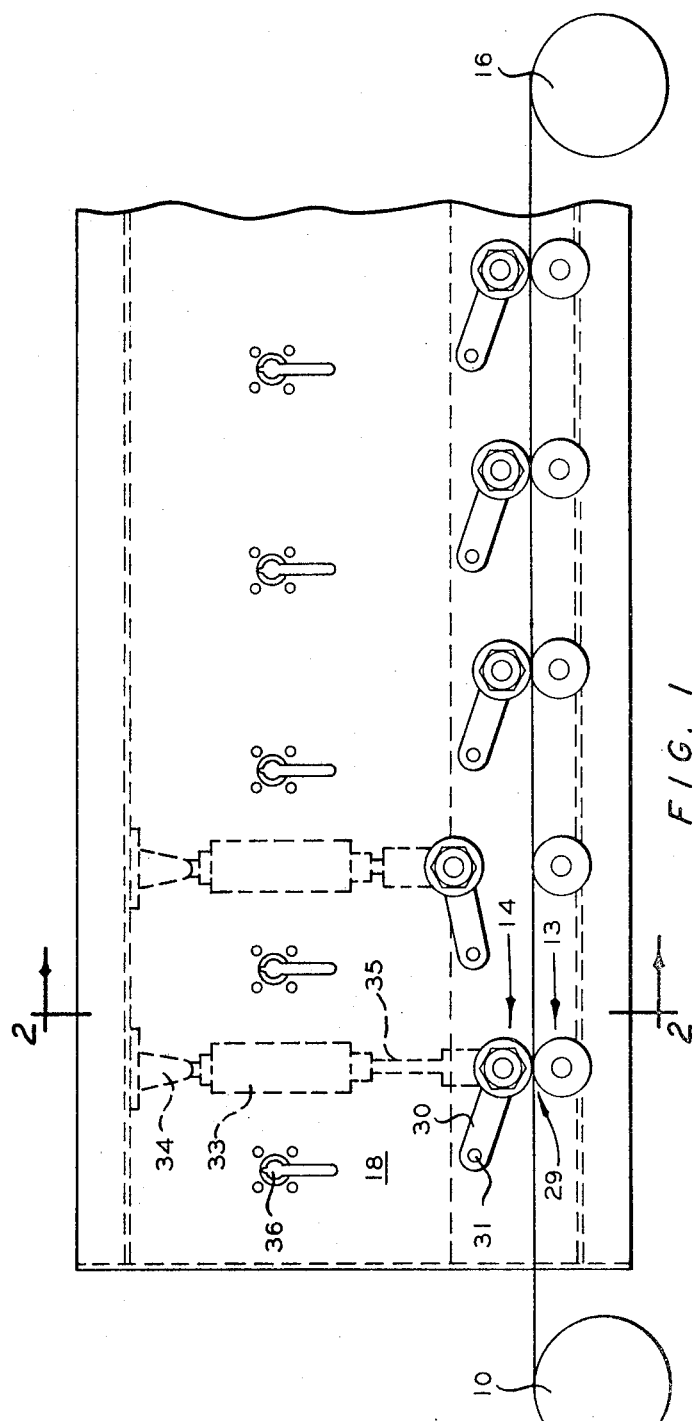
INVENTOR.
M. E. GREENE
BY Young and Quigg
ATTORNEYS

FIBRILLATION

This invention relates to an apparatus for producing a fibrous material from a thermoplastic film.

It is well known that many synthetic organic polymers exhibit the property of marked fissility when uniaxially oriented. In recognition of this property, a method has been developed to produce the so-called split fibers by mechanically working the high oriented film. Many devices of diverse description and configurations have been proposed for mechanically working the film to promote the splitting up, or fibrillation. A few of such devices include rotating brushes, rotating belts, counterrotating rollers, oscillating rollers, oscillating plates, rotating spikes, rotating cutters, impinging air jet, and the like. Such devices, however, may be classified in two general groups: (1) those for applying a transverse stress to the film to promote the fibrillation, and (2) those for slitting or cutting the film. The latter group is generally employed to produce a fibrous material characterized as having a regular network structure. The fibrous materials which exhibit a regular network structure are ideally suited for the formation of nonwoven fabrics and for twisting to form yarn.

The devices which operate on the principle of cutting the film may employ a roller having a plurality of cutting blades and a backup roller provided with a resilient cover. The rollers are arranged so as to present confronting peripheral portions through which the film is passed. The cutting blades penetrate through the film and imbed in the resiliently covered roller. The resulting fibrous pattern depends on the configuration of the cutting blades. For example, circumferentially extending blades have been used to cut elongate slits in the film thereby producing a reticulated, tortoise shell-like pattern. It has been found that the pressure maintained in the cutting zone defined by the confronting peripheries of the rollers is quite critical —too low a pressure causes insufficient cutting while too high a pressure damages the backup roller. Furthermore the cutting pressure must be varied in accordance with the type of polymer used and the film thickness. For example, if a thick film is used, a larger cutting pressure will be required to provide sufficient film penetration. The cutting pressure must be such to cause the blades to penetrate the film and imbed a predetermined amount in the resilient backup roller.

The purpose of the present invention is to provide a novel cutting roller assembly to effect fibrillation and to provide a means for controlling the cutting pressure. These objects are accomplished by an apparatus including a cutting roller having a plurality of radially projecting teeth and biasing means for controlling the cutting pressure.

These and other objects will be apparent to those skilled in the art from the following disclosure taken in conjunction with the drawings in which:

FIG. 1 is a diagrammatic view of a system for fibrillating thermoplastic film:

FIG. 3 is a sectional view of the mechanism shown in FIG. 2 and taken generally along the cutting plane indicated by the line 3–3 thereof; and FIG. 4 is an enlarged fragmentary view of the cutting rollers shown in FIG. 1.

Figure 2:
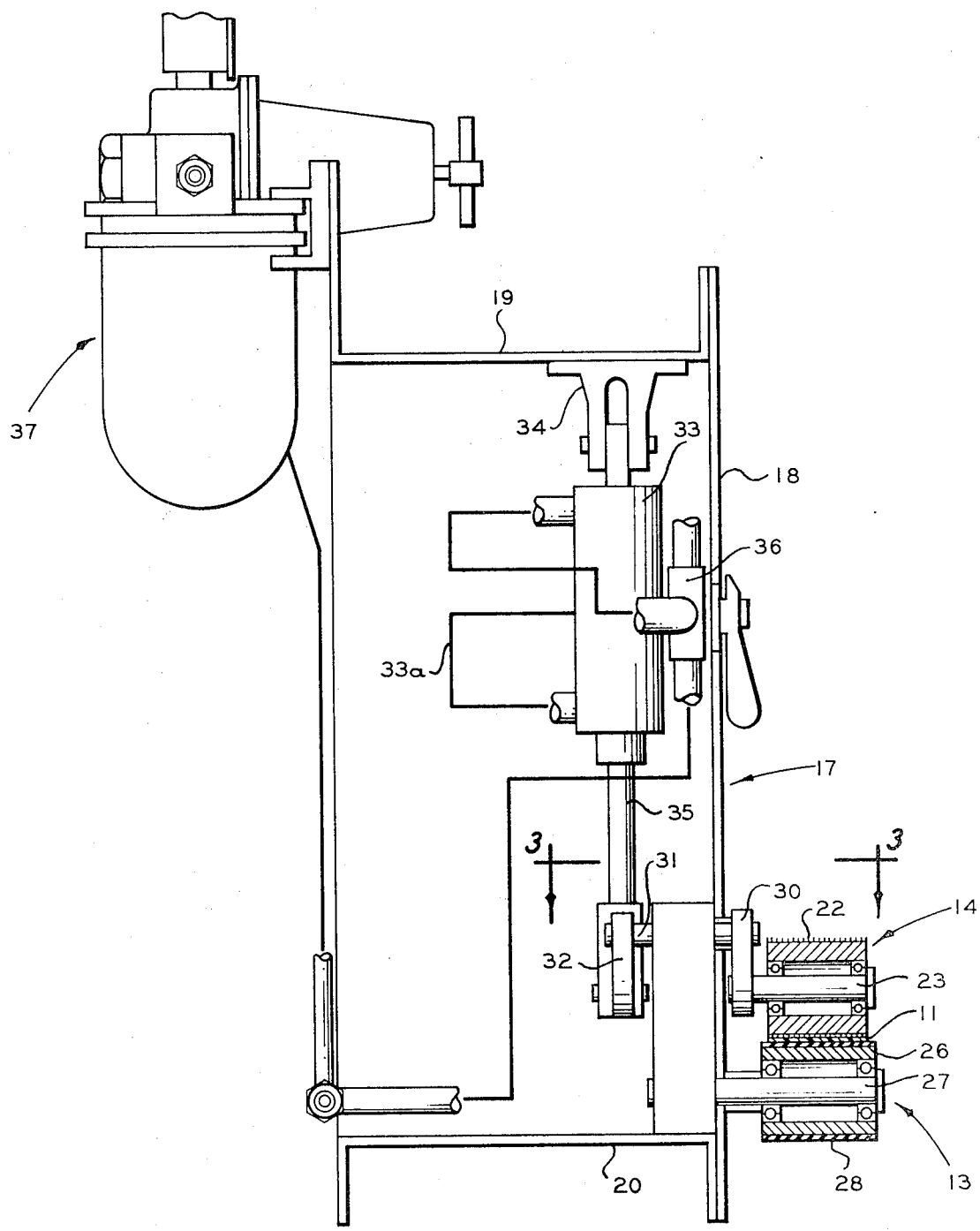
FIG. 2 is an enlarged sectional view of the cutting mechanism and associated control means shown in FIG. 1 and taken generally along the cutting plane indicated by line 2–2 thereof.

The cutting mechanism of this invention may be described in connection with a system of type shown generally in FIG. 1. The system includes a supply package 10 of oriented plastic film from which the film 11 passes successively through a series of cutting roller assemblies, each assembly comprising serrated roller 13 and backup roller 14. The split film then is rolled up on takeup roller 16 for subsequent disposition. The takeup roller 16 may be power driven to stretch or draw the film if desired.

Referring now to FIGS. 2 and 3, the rollers 13 and 14 are shown mounted on a frame 17 which includes a front panel 18 and an upper channel 19 and lower channel 20. In this embodiment, the upper roller 14 constitutes the cutting roller while the lower roller 13, provided with a resilient cover, acts as a backup for the cutting roller 14.

The cutting roller 14 has a main body portion 21 and arranged radially extending teeth 22 integrally formed therewith. The roller 14 is journally mounted on a stub shaft 23. As shown in FIGS. 3 and 4, the triangular teeth 22 are arranged in axial alignment and may be truncated at the tips to minimize mastication of the backup roller 13. In cross section, the teeth taper from the base to the tip forming a sharp edge 25 at the truncated tip.

The leading and trailing edges of each tooth 22 define an included angle of 60°. The teeth 25 are beveled from an outer point of 5 mils to a base thickness of 10 mils. The beveled teeth provide for an axial space which determines the thickness of each fibre as adjacent teeth penetrate and separate the film 11 in the cutting zone described below. Although a variety of tooth configurations and patterns are possible, it has been found that a tooth density of 625 per square inch, a tooth thickness ranging from 5 to 10 mils, a tip length of 75 mils, and a circumferentially spaced, axially aligned pattern provides for a uniformly fibrillated product.

The backup roller 13 has an inner metal core 26 rotatably mounted on a stub shaft 27 which in turn is fixedly mounted to front panel 18. The outer periphery of the core 26 is covered with a resilient material 28 such as rubber. The backup roller 13 is arranged in relation to the cutting roller 14 so that the confronting peripheries define a cutting zone 29 through which the film 11 passes. Thus it will be appreciated that the rollers 13 and 14 are mounted for free wheel rotation on their respective shafts 27, 23 and are arranged in parallel relation with roller 14 being movable relative to roller 13.

As mentioned previously, the cutting pressure in the cutting zone 29 must be accurately controlled in order to impart the desired amount of fibrillation and yet not to damage the backup roller 13. In accordance with this invention, a control means is provided to apply a force on the cutting roller 14 in order to maintain the desired pressure in zone 29. The stub shaft 23 on which the cutting roller 14 is rotatably mounted is secured to one end of an arm 30 having its opposite end pivotally mounted on the front panel 18 by means of another stub shaft 31. Stub shaft 31 extends through the panel 18 and has mounted on the backside thereof another arm 32 which is identical to arm 30 and extends parallel thereto. A pneumatic cylinder 33 pivotally attached to the upper channel 19 by yoke 34 has a piston rod 35 hinged to the outer end of arm 32 (see FIG. 3). The cylinder 33 is double acting having suitable lines 33a connected in circuit with a four-way manually operated directional valve 36 and a pressure control valve 37. The pressure control valve 37 is provided with a suitable supply of pressurized air. By actuating the four-way valve 36, the cutting roller 14 may be moved from the operating position, wherein the rollers 13 and 14 are in confronting relation, to an inoperative position, wherein the rollers 13 and 14 are radially spaced apart (both positions shown in FIG. 1). The pressure control valve 37 may be adjusted to vary the pressure to the cylinder 33 so that the force imparted to the roller 14 through the linkage comprising arm 32, shaft 31, arm 30, and shaft 23 may be varied. The force exerted on the cutting roller 14 of course determines the pressure in cutting zone 29.

In describing the operation, let it be assumed that a film of given thickness is being processed in the system of FIG. 1. The pressure of pneumatic fluid delivered to the cylinder 33 is adjusted by manipulating the controls of the control valve 37 to give the desired amount of force applied to the roller 14. The proper amount of force provides a cutting pressure or zone 29 which causes the teeth 22 to penetrate the film 11 and imbed slightly in the roller 13. Now, let it be assumed that it is desired to fibrillate a material having a greater thickness. The controls of the four-way valve 36 are manipulated to cause airflow to enter the rod end of the cylinder 33. This retracts the piston rod 35 moving the cutting roller 14 to the inoperative position.

The first film is withdrawn and the next film is inserted in the system of FIG. 1. Next, the manual controls of the four-way valve 36 are again manipulated causing airflow to the head end of cylinder 33. This extends piston rod 35 thereby moving the cutting roller 14 to the operative position. Now, since a thicker film is being accommodated, a greater force is required to cause the teeth 25 to penetrate the film 11. The manual controls of the control valve 37 are adjusted to increase the pneumatic pressure to the head end of cylinder 33. Thus, the force delivered to the cutting roller 14 is increased causing an increase in the cutting pressure in zone 29. Trial and error may be required to determine the optimum cutting pressure in zone 29 for a particular polymer and film thickness. The degree of fibrillation will depend upon the number of cutting assemblies in operation. For example if a high degree of fibrillation is desired, all of the cutting assemblies may be put in operation. It may be desirable to vary the cutting pressure in each of the cutting zones 25. For a tough material which is difficult to fibrillate, the first or second cutting assemblies arranged in series may be used to condition the film which will require a different pressure setting than the latter assemblies used to fibrillate the film. Thus the apparatus of the present invention offers a wide range of operational procedures.

The control means of this invention is particularly applicable for a roller 14 having sharp edges as the cutting members. Since the teeth 22 are tapered, the length of the slit in the film will be the function of the depth of penetration. Thus, if a short slit is desired, the force imparted by the cylinder 33 may be adjusted downwardly so that the tips 25 of teeth 22 barely penetrate the film 11. On the other hand, if a long slit is desired, the force is adjusted upwardly so that a substantial portion of the teeth 22 penetrates the film. Of course, the amount of penetration cannot exceed an upper limit which would damage the rubber cover 28 of the backup roller 13. As shown in FIG. 4, the depth of penetration of the teeth 22 in the rubber cover 28 has the effect of imparting a kneading action on the film 11. The pressure in zone 29 can vary the amount of kneading. Low pressure imparts little kneading while a high pressure imparts substantial kneading. The kneading action has the effect of texturizing the fibrillated film.

The cutting mechanism and associated pressure controls of this invention may be used with a film composed of any of the orientable thermoplastic linear polymers having crystalline properties. Such include 1-olefins having from two to eight carbon atoms, copolymers and blends thereof, nylon polyesters, polyvinyl alcohol, acrylic polymers, polyvinyl chloride, polyvinyl acetate, polyvinylidene chloride, and the like.

The film 11 can be of any length and width substantially any thickness, the minimum thickness being only that which will provide a substantially self-sustaining film and the maximum thickness being that which is capable of being penetrated by the cutting teeth. It should be observed that by virtue of the pressure control means of this invention that the cutting mechanism is adaptable to a wide range of thicknesses. For example, if the thickness of the film were such a present considerable resistance to the cutting action of the teeth, the force of cylinder 32 can be increased to provide an increased pressure in the cutting zone 29. It has been found that for fibrillating a 0.7 mil thick 400 mil wide film of polypropylene drawn in a ratio of 10 to 1, a cylinder pressure of 30 p.s.i.g. which results in a force of 2.43 pounds on the cutting roller provides for a sufficient cutting pressure in zone 29.

While this preferred embodiment has been described in particular detail, it should be emphasized that modifications and variations may be made therein without departing from the scope and spirit of this invention as set forth in the appended claims.

I claim:

1. An apparatus for fibrillating an oriented film of thermoplastic material, said apparatus comprising:
    a cutting roller having a plurality of tapered teeth projecting radially therefrom and terminating at an outer tip with each of said teeth having a cutting edge;
    a backup roller arranged relative to said cutting roller so that the peripheries of said rollers define a cutting zone; and
    force means operative upon one of said rollers for maintaining a cutting pressure in said cutting zone to provide a predetermined fixed relation between said rollers, said means being adjustable for varying said pressure in said cutting zone so that the depth of penetration in said film may be varied to effect different lengths of slits in said film.

2. The invention as recited in claim 1 wherein said backup roller includes a resilient cover for yieldably receiving said cutting blades therein.

3. The invention as recited in claim 1 wherein said force means is operative upon said cutting roller.

4. The invention as recited in claim 1 wherein said force means includes a pneumatic cylinder for imparting a force on said cutting roller, manual control means for reversing airflow to said cylinder for moving said cutting roller between said operative and inoperative positions.

5. An apparatus, as set forth in claim 1 wherein the teeth each have truncated triangular configuration and taper from a base to a tip of the tooth forming a sharp cutting edge at said tip, and wherein the bases of adjacent teeth are in engagement.

Disclaimer and Dedication 3,566,735.—*Max E. Greene*, Spartanburg, S.C. FIBRILLATION. Patent dated Mar. 2, 1971. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]